T. BEACH.
Sugar-Mold Carriage.
No. 40,454. Patented Nov. 3, 1863.
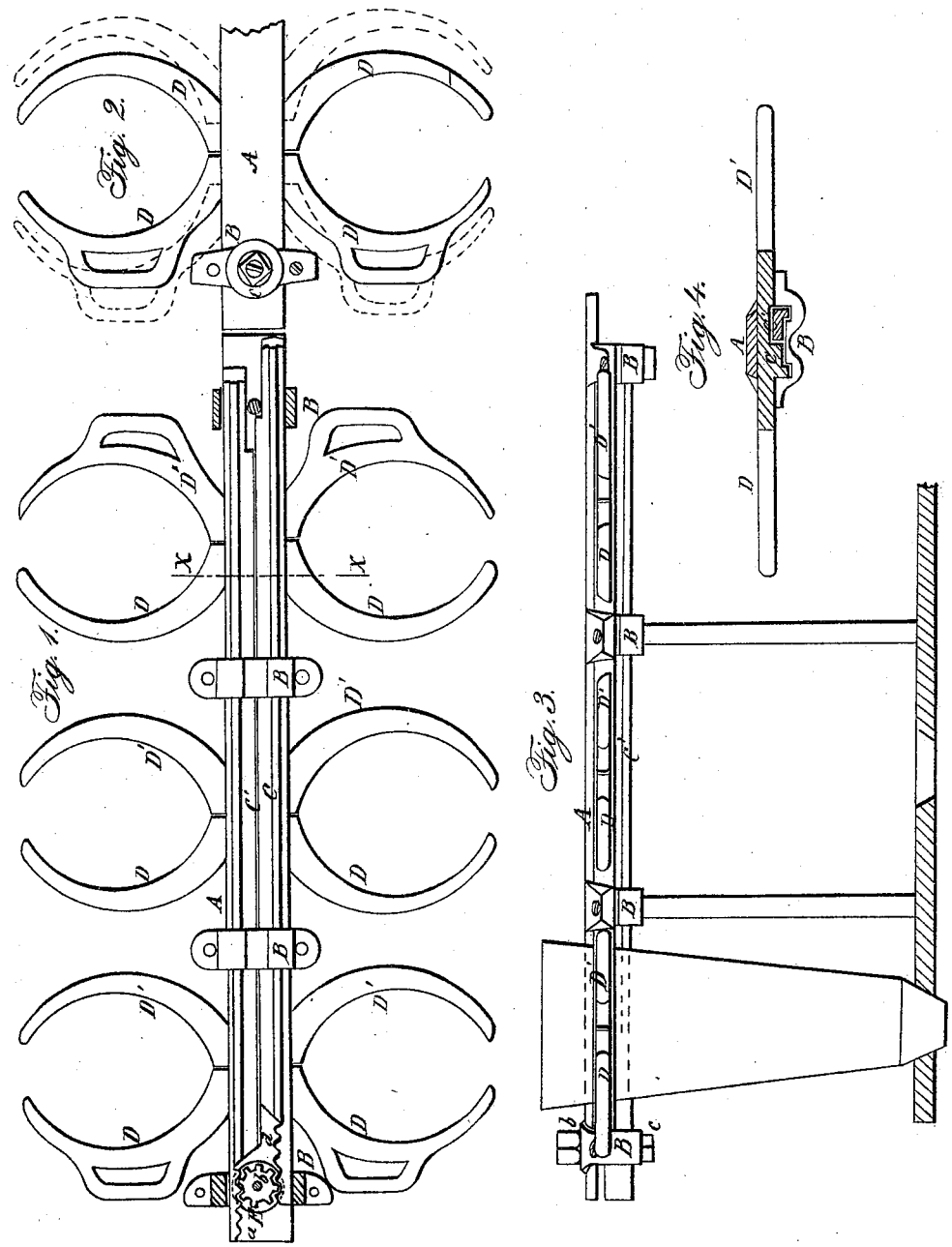
Witnesses:
Inventor:

UNITED STATES PATENT OFFICE.

THADDEUS BEACH, OF NEW YORK, N. Y.

IMPROVEMENT IN SUGAR-MOLD CARRIAGES.

Specification forming part of Letters Patent No. 40,454, dated November 3, 1863.

*To all whom it may concern:*

Be it known that I, THADDEUS BEACH, of No. 314 West Twenty-Eighth street, in the city, county, and State of New York, have invented a new and useful Improvement in Sugar-Mold Carriages; and I do hereby declare that the following is a full, clear, and exact description of the same, reference being had to the accompanying drawings, making a part of this specification, in which—

Figure 1 is an inverted plan of my invention; Fig. 2, a plan or top view of a portion of the same; Fig. 3, a side view of the same; Fig. 4, a transverse vertical section of the same taken in the line $x$ $x$, Fig. 1.

Similar letters of reference indicate corresponding parts in the several figures.

This invention relates to a new and useful improvement in sugar-mold carriages, such as are employed for conveying filled sugar-molds to the drying-apartment in sugar-refineries.

The invention consists in the novel and improved means for grasping or holding the tops of the molds in the carriage, whereby the carriage may, with the greatest facility, be adapted for holding different-sized molds, as hereinafter fully set forth.

To enable those skilled in the art to fully understand and construct my invention, I will proceed to describe it.

A represents a bar or plate, which extends longitudinally the whole length of the carriage, and has a series of guides or loops, B, attached to its under side. Between these guides B and the plate A there are placed, side by side, two parallel bars, C C', which are allowed to move or work freely in a longitudinal direction, and each of which has a series of curved arms, D D', projecting laterally from it at each side, the arms D of one bar, C, being curved in an opposite direction to those D' of the other bar, C', as shown clearly in Fig. 1. The bar or plate A, and consequently the bars C C' and their arms D D', form the top of the carriage, and the plate A may be supported at a proper height from the lower part of the carriage by means of suitable uprights connected with the guides B, as shown in red outline in Fig. 3.

The lower part of the carriage may be constructed in the usual way, and provided w recesses to receive the tips of the molds, as shown in red outline in Fig. 3, and the upper parts of the molds are grasped and held by the arms D D', the arms of one bar, C, being at one side of the mold, and those of the other bar, C', at the opposite side. The arms D D' are adjusted to suit molds of different sizes by moving the bars C C', and this may be done by having a rack, $a$, at the inner side of each bar C C' at one end of the same, into which racks a pinion, E, gears, said pinion being on a shaft, $b$, which passes vertically through the plate A, and has a nut, $c$, on its lower end, by screwing up which the bars C C', and consequently the arms D D', may be held at any desired point. The arms D D', it will be seen, may be readily adjusted by loosening or unscrewing the nut $c$ and turning the pinion E, which moves the bars C C' simultaneously toward and from each other. By this arrangement it will be seen that the arms D D' may be adjusted with the greatest facility, so as to grasp molds of different sizes.

The above-named parts are all constructed of metal.

I am aware that sugar-mold carriages have been constructed with adjustable plates provided with curved arms, one plate being placed over the other, and arranged so as to slide, as seen in the patent granted to Havemeyer and Schnitzpan on the 18th of March, 1862; but this device does not admit of a ready adjustment of the arms, and, besides, the arms of both plates are not in the same plane as in my invention.

By my invention I afford a more steady and secure support for the upper part of the mold by arranging the jaws in one plane, and also provide a more easy and convenient means of setting the jaws at any required distance asunder, and of clamping the upper part of the molds when in position.

While distinctly disclaiming novelty in the use of adjustable jaws in sugar-mold carriages, I do claim as new and desire to secure by Letters Patent—

The combination, with jaws D D', set in the same horizontal plane, of bars C C', for communicating simultaneous motion to the respective jaws, racks $a$ $a'$, attached to the said bars, and the pinion E, for imparting motion thereto, when all the said parts are constructed and arrranged in the manner and for the purposes herein specified.

THADDEUS BEACH.

Witnesses:
J. W. COOMBS,
THOS. J. DOUGLAS.